US012646832B2

(12) United States Patent
Chiu et al.

(10) Patent No.: US 12,646,832 B2
(45) Date of Patent: Jun. 2, 2026

(54) DOUBLE-AXIS ROTATING ANTENNA STRUCTURE

(71) Applicant: Wistron NeWeb Corporation, Hsinchu (TW)

(72) Inventors: Yu-Kai Chiu, Hsinchu (TW); Yuan Yu Chen, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 37 days.

(21) Appl. No.: 19/014,912

(22) Filed: Jan. 9, 2025

(65) Prior Publication Data

US 2026/0039015 A1 Feb. 5, 2026

(30) Foreign Application Priority Data

Aug. 2, 2024 (TW) ................................ 113129083

(51) Int. Cl.
*H01Q 3/08* (2006.01)

(52) U.S. Cl.
CPC .................................... *H01Q 3/08* (2013.01)

(58) Field of Classification Search
CPC . H01Q 3/02–08; H01Q 1/125; H01Q 3/12–18
See application file for complete search history.

(56) References Cited

U.S. PATENT DOCUMENTS

| | | | | |
|---|---|---|---|---|
| 5,945,961 | A * | 8/1999 | Price | H01Q 1/125 343/882 |
| 8,542,156 | B2 * | 9/2013 | Patel | H01Q 1/005 343/765 |
| 11,569,560 | B2 * | 1/2023 | Gothelf | H01Q 1/32 |
| 12,469,965 | B2 * | 11/2025 | Lee | H01Q 3/36 |
| 2020/0168989 | A1 * | 5/2020 | Fukui | H01Q 1/27 |

FOREIGN PATENT DOCUMENTS

| | | |
|---|---|---|
| CN | 112259952 A | 1/2021 |
| CN | 117728181 A | 3/2024 |

* cited by examiner

*Primary Examiner* — Hasan Islam
(74) *Attorney, Agent, or Firm* — McClure, Qualey & Rodack, LLP

(57) ABSTRACT

A double-axis rotating antenna structure includes a base, a yawing mechanism and an antenna module. The yawing mechanism includes a yawing bracket movably disposed at the base and yawing relative to the base. The antenna module includes a pitching assembly and an antenna assembly. The pitching assembly includes a pitching bracket movably disposed at the yawing bracket and pitching relative to the yawing bracket. The antenna assembly is disposed at the pitching bracket and includes an antenna dish. The yawing bracket and the pitching bracket drive the antenna dish to yaw and pitch, thereby adjusting a yawing angle and a pitching angle of the antenna dish.

18 Claims, 5 Drawing Sheets

DOUBLE-AXIS ROTATING ANTENNA STRUCTURE

RELATED APPLICATIONS

This application claims the benefit of priority to Taiwan Patent Application No. 113129083, filed on Aug. 2, 2024. The entire content of the above identified application is incorporated herein by reference.

BACKGROUND

Technical Field

The present disclosure relates to an antenna structure, particularly to a double-axis rotating antenna structure.

Description of Related Art

Generally, when installing an antenna dish, installation personnel needs to try different angles multiple times to find the optimal reception angle, and then uses mechanical fixing methods (e.g., screws) to fix it in the designated position. When the radiation direction of the signal source changes, such as due to the earth's rotation, changes in the base station's environmental conditions, or damage to the main base station causing the signal to direct towards a secondary base station, the angle of the antenna dish needs to be manually adjusted again.

Moreover, existing antenna dishes are mounted on a platform that can only yaw, limiting its search range to one rotational dimension, making it difficult to adjust to the optimal angle, and thus there is room for improvement.

SUMMARY

According to an embodiment of the present disclosure, a double-axis rotating antenna structure is provided, the double-axis rotating antenna structure including a base, a yawing mechanism, and an antenna module. The yawing mechanism includes a yawing bracket, the yawing bracket being movably disposed on the base and yawing relative to the base. The antenna module includes a pitching assembly and an antenna assembly. The pitching assembly includes a pitching bracket, the pitching bracket being movably disposed on the yawing bracket and pitching relative to the yawing bracket. The antenna assembly is disposed on the pitching bracket and includes an antenna dish. The yawing bracket and the pitching bracket drive the antenna dish to yaw and pitch, thereby adjusting a yawing angle and a pitching angle of the antenna dish.

According to another embodiment of the present disclosure, a double-axis rotating antenna structure is provided, the double-axis rotating antenna structure including a yawing mechanism and an antenna module. The yawing mechanism includes a yawing bracket. The antenna module includes a pitching motor, a pitching gear, an arc gear, and an antenna assembly. The pitching motor is disposed on the yawing bracket. The pitching gear is connected to the pitching motor and driven by the pitching motor to rotate. The arc gear is driven by the pitching gear. The antenna assembly is linked by the arc gear and includes an antenna dish. The pitching motor drives the pitching gear, which in turn drives the arc gear to adjust a pitching angle of the antenna dish; the yawing bracket yaws to adjust a yawing angle of the antenna dish.

BRIEF DESCRIPTION OF THE DRAWINGS

The described embodiments may be better understood by reference to the following description and the accompanying drawings, in which.

DETAILED DESCRIPTION

Figure 1:
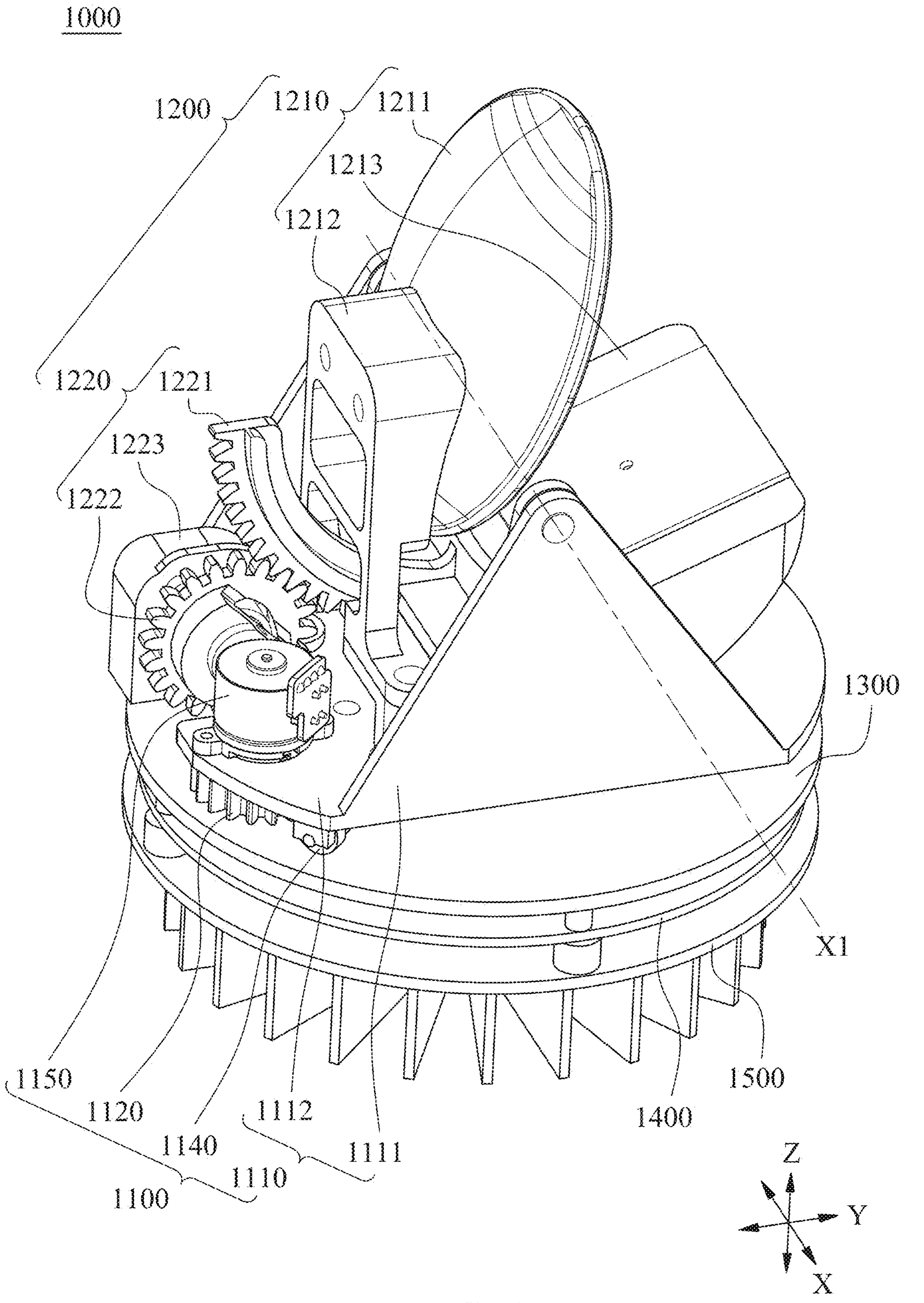
FIG. 1 is a perspective view of a double-axis rotating antenna structure according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same element can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
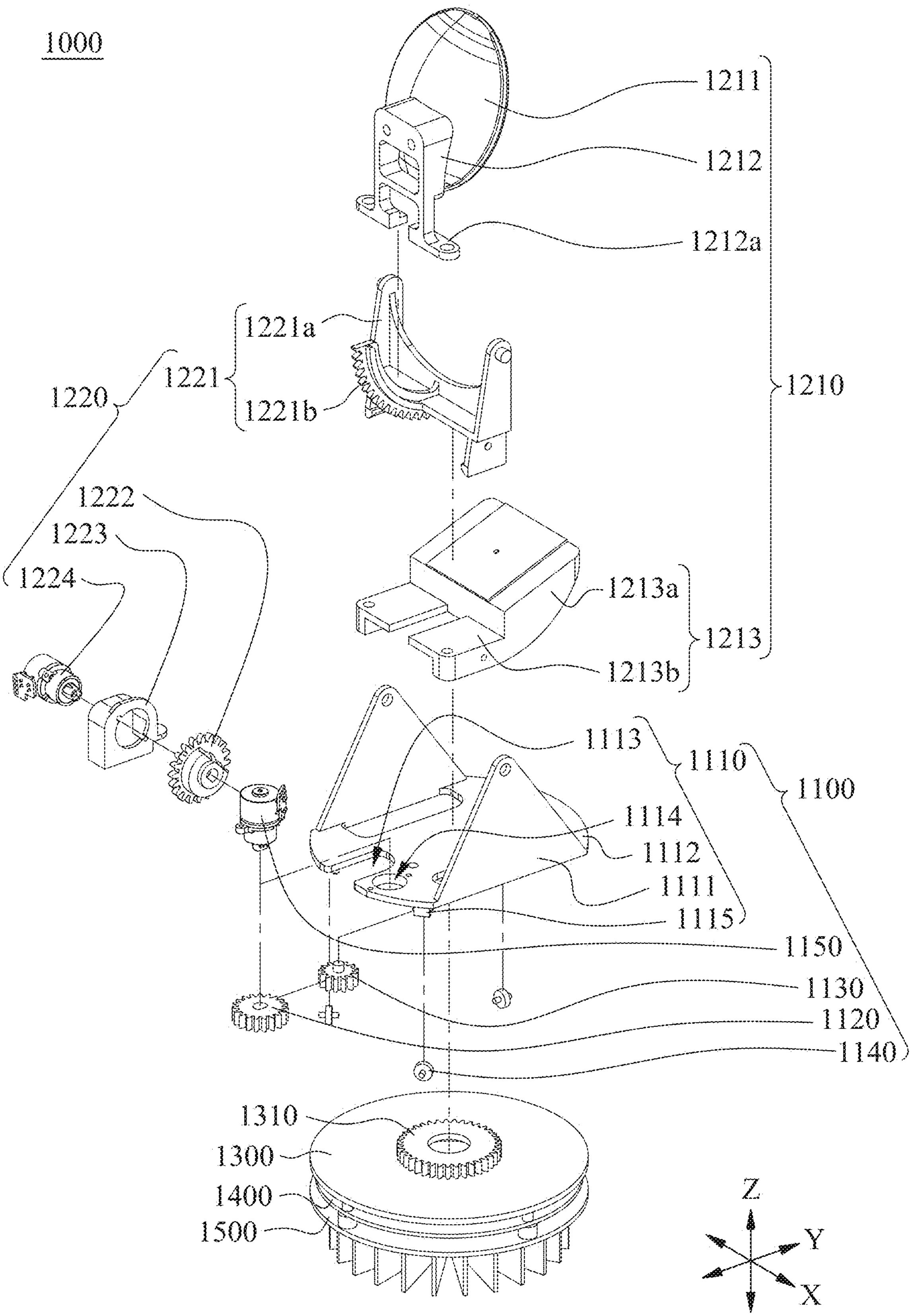
FIG. 2 is an exploded view of the double-axis rotating antenna structure of the embodiment in FIG. 1.
Figure 3:
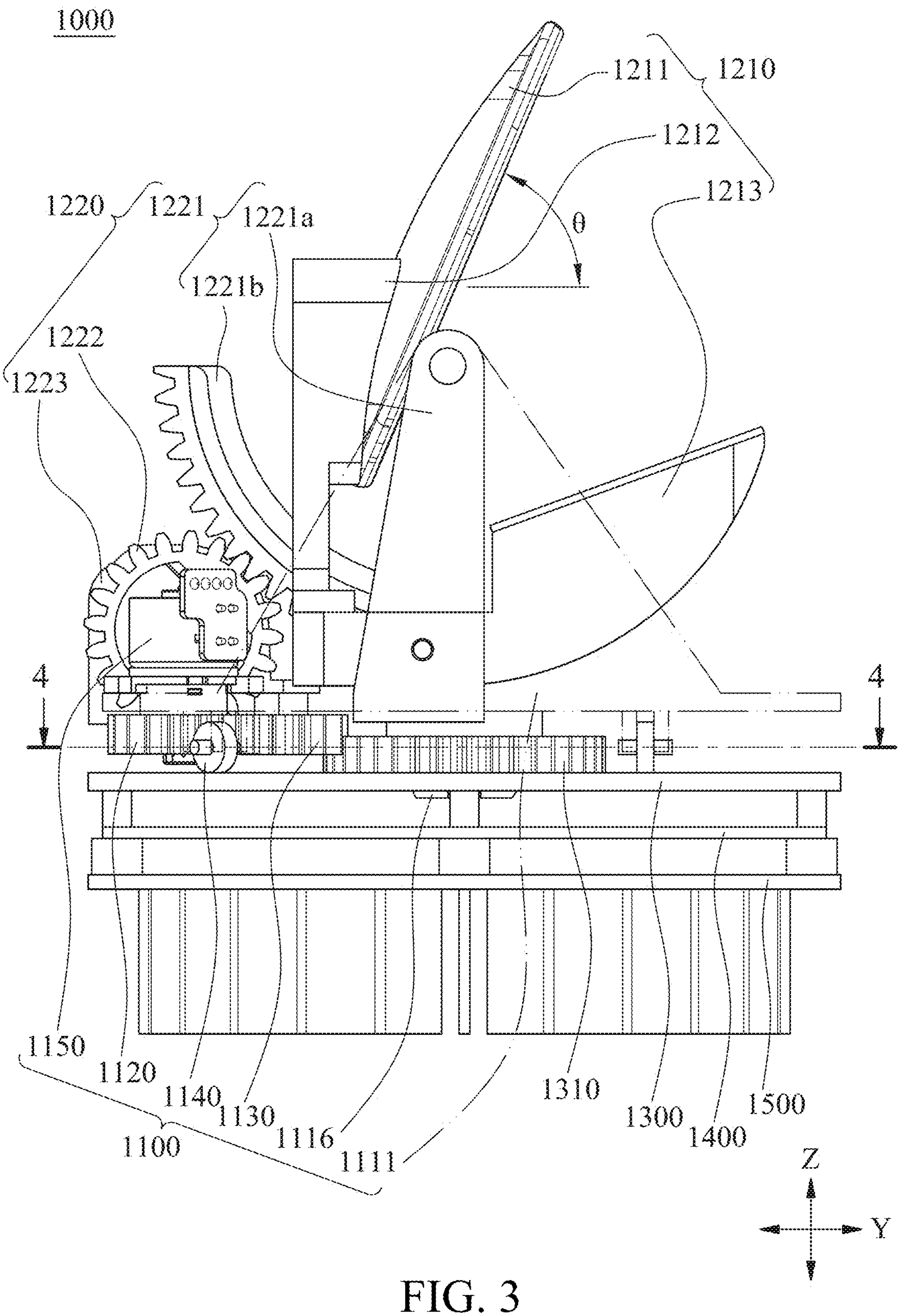
FIG. 3 is a side view of the double-axis rotating antenna structure of the embodiment in FIG. 1.

Referring to FIG. 1, FIG. 2, and FIG. 3, FIG. 1 is a perspective view of a double-axis rotating antenna structure 1000 according to an embodiment of the present disclosure, FIG. 2 is an exploded view of the double-axis rotating antenna structure 1000 of the embodiment in FIG. 1, and FIG. 3 is a side view of the double-axis rotating antenna structure 1000 of the embodiment in FIG. 1. The double-axis rotating antenna structure 1000 includes a yawing mechanism 1100 and an antenna module 1200.

The yawing mechanism 1100 includes a yawing bracket 1110. The antenna module 1200 includes a pitching assembly 1220 and an antenna assembly 1210. The pitching assembly 1220 includes a pitching bracket 1221, the pitching bracket 1221 being movably disposed on the yawing bracket 1110 and pitching relative to the yawing bracket 1110. The antenna assembly 1210 is disposed on the pitching bracket 1221 and includes an antenna dish 1211. The yawing bracket 1110 and the pitching bracket 1221 drive the antenna dish 1211 to yaw and pitch, thereby adjusting a yawing angle β (shown in FIG. 4) and a pitching angle θ of the antenna dish 1211.

Accordingly, the yawing angle β and pitching angle θ of the antenna dish 1211 can be individually adjusted, helping to adjust the antenna dish 1211 to the optimal reception angle.

The double-axis rotating antenna structure 1000 can further include a base 1300, with the yawing bracket 1110 being movably disposed on the base 1300 and yawing relative to the base 1300. The yawing bracket 1110 can include a baseplate 1112 and two arms 1111, the two arms 1111 being spaced apart and protruding from the baseplate 1112, and the pitching bracket 1221 is pivotally connected between the two arms 1111.

Specifically, the base 1300 is generally disc-shaped and includes a central gear 1310, the central gear 1310 including a gear hole, and the body of the base 1300 and the central gear 1310 can be integrally formed using plastic molding. The double-axis rotating antenna structure 1000 can further include a control circuit board 1400 and a heat dissipation plate 1500, the control circuit board 1400 and the heat dissipation plate 1500 being disposed below the base 1300.

The yawing bracket 1110 can further include a limiting protrusion 1116, the limiting protrusion 1116 protruding from a lower surface of the base 1300 facing towards the baseplate 1112, and the limiting protrusion 1116 is pivotally disposed at the gear hole, allowing the yawing bracket 1110 to yaw relative to the base 1300, i.e., rotating on the X axis-Y axis plane. The baseplate 1112 is elongated and includes two arc edges and two straight edges; each arm 1111 may have an isosceles triangle structure and connect to each straight edge. The yawing bracket 1110 can further include a groove 1113 and a through hole 1114, the groove 1113 being located on the baseplate 1112 and extending inward from one of the arc edges of the baseplate 1112, and the through hole 1114 penetrating the baseplate 1112 and being located beside the groove 1113.

Figure 4:
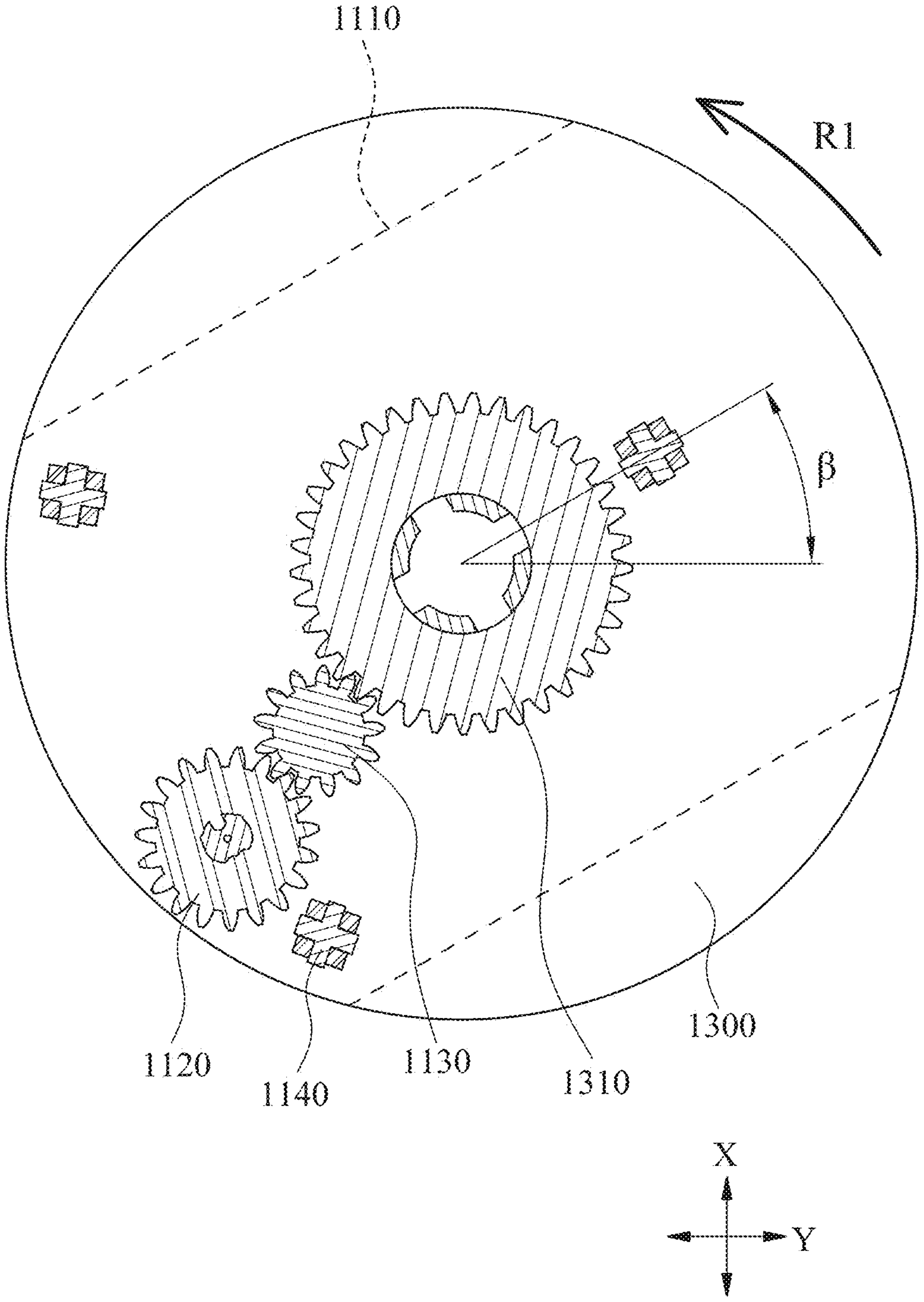
FIG. 4 is a top cross-sectional view of the double-axis rotating antenna structure of the embodiment in FIG. 3 taken along the cross-section line 4-4.

Please refer to FIG. 4 together with FIG. 1 to FIG. 3, FIG. 4 is a top cross-sectional view of the double-axis rotating antenna structure 1000 of the embodiment in FIG. 3 taken along the cross-section line 4-4. The yawing mechanism 1100 can further include a yawing drive gear 1120 and a yawing transmission gear 1130, the yawing drive gear 1120 being disposed between the baseplate 1112 and the base 1300, and the yawing transmission gear 1130 meshing between the yawing drive gear 1120 and the central gear 1310; the yawing drive gear 1120 is driven to move along a circumferential direction R1 of the central gear 1310. The yawing mechanism 1100 can further include a yawing motor 1150, the yawing motor 1150 being disposed on the baseplate 1112 and driving the yawing drive gear 1120.

As shown in FIG. 1 to FIG. 4, the yawing motor 1150 is disposed on the baseplate 1112 and protrudes towards the base 1300 through the through hole 1114, and the yawing drive gear 1120 is connected to the drive shaft of the yawing motor 1150 so as to be driven by the yawing motor 1150 to rotate. The yawing transmission gear 1130 can be pivotally disposed on the baseplate 1112, and since it simultaneously meshes with the yawing drive gear 1120 and the central gear 1310, when the yawing drive gear 1120 rotates, the yawing transmission gear 1130 can also be driven, causing the yawing transmission gear 1130 to rotate relative to the central gear 1310, to drive the yawing bracket 1110 to move along the circumferential direction R1 of the central gear 1310, performing yawing. It should be particularly noted that in FIG. 1, the orientation of the antenna dish 1211 is parallel to the Y-axis, at which the yawing angle β can be considered 0 degrees, while in FIG. 4, the yawing bracket 1110 has yawed clockwise, making the yawing angle β of the antenna dish 1211 to not be 0 degrees.

Furthermore, the yawing mechanism 1100 can further include a plurality of wheels 1140, the wheels 1140 being spaced apart and pivotally disposed on a lower surface of the baseplate 1112 and contacting the base 1300. As shown in FIG. 2 and FIG. 4, there are three wheels 1140, and the yawing bracket 1110 can further include three pivot seats 1115, the three pivot seats 1115 being spaced apart and disposed on the lower surface of the baseplate 1112, and each wheel 1140 is pivotally disposed on each pivot seat 1115. Accordingly, each wheel 1140 has a rotational support function, preventing deformation of the baseplate 1112 due to gravity. Additionally, the wheels 1140 can enhance smoothness when the yawing bracket 1110 is rotating relative to the base 1300, and can replace bearings to reduce costs.

The pitching bracket 1221 can include a support frame 1221*a* and an arc gear 1221*b*, the support frame 1221*a* being pivotally connected to the two arms 1111 and locked to the antenna assembly 1210, and the arc gear 1221*b* protruding from the middle section of the support frame 1221*a*. The pitching assembly 1220 can further include a pitching motor 1224 and a pitching gear 1222, the pitching motor 1224 being disposed on the baseplate 1112, and the pitching gear 1222 meshing with the arc gear 1221*b* and being driven by the pitching motor 1224.

The support frame 1221*a* is pivotally connected to the two arms 1111 at two pivot points CR (shown in FIG. 5), respectively. Specifically, the support frame 1221*a* can include a main body and two swing arms, the two swing arms being connected to the two sides of the main body and each swing arm being pivotally connected to each arm 1111. The pivot points CR are respectively located on the swing arms, the two pivot points CR form a pitching axis X1, and the arc gear 1221*b* protrudes from the main body along a direction perpendicular to the pitching axis X1. It should be particularly noted that when the pitching axis X1 is parallel to the X-axis, the arc gear 1221*b* is located on the Y axis-Z axis plane.

In this embodiment, the support frame 1221*a* and the arc gear 1221*b* are made of a plastic material, and the support frame 1221*a* and the arc gear 1221*b* are integrally formed. Accordingly, by using plastic molding to form in one piece, cost advantages can be achieved compared to separate parts (using transmission gear parts, and plastic parts without gears locked together), while also reducing interference to signal reception.

The pitching assembly 1220 can further include a fixing element 1223, the fixing element 1223 being disposed on the baseplate 1112 and having a motor hole, the pitching motor 1224 can pass through the motor hole, and the axis of the pitching motor 1224 is parallel to the pitching axis X1. The pitching gear 1222 is connected to the drive shaft of the pitching motor 1224, and its position corresponds to the groove 1113. Thus, the groove 1113 can form a clearance space for the pitching motor 1224 to protrude thereinto.

The pitching motor 1224 can drive the pitching gear 1222 to rotate, thereby driving the arc gear 1221*b* that meshes with it, thus driving the pitching bracket 1221 to pitch around the pivot points CR. It should be noted that the line connecting the pivot points CR and the center point of the pitching gear 1222 in the Y axis-Z axis plane can form a 45-degree angle with the Y-axis, thus driving the pitching bracket 1221 to rotate ±45 degrees, allowing the pitching angle θ to range from 0 degrees to 90 degrees; however, in other embodiments, the pitching angle can be adjusted as needed and is not limited thereto.

The antenna assembly 1210 can further include an antenna bracket 1212 and a heat sink 1213, the antenna bracket 1212 being connected to the antenna dish 1211 and including two pins 1212*a*. The heat sink 1213 includes an arc block 1213*a* and two connecting portions 1213*b*, the arc block 1213*a* including a flat surface for an antenna circuit board to be placed thereon, and the two connecting portions 1213*b* protrude from one side of the arc block 1213*a*. During assembly, each swing arm of the support frame 1221*a* can initially be locked to the sides of each connecting portion 1213*b*, then each pin 1212*a* can be locked to the end of each connecting portion 1213*b* that is farther from the arc block 1213*a*, thereby connecting the antenna assembly 1210 and the pitching bracket 1221. The pitching bracket 1221 is then pivotally connected to the two arms 1111 of the yawing bracket 1110, thus allowing the control circuit board 1400 to control the yawing mechanism 1100 for driving the antenna dish 1211 to adjust the yawing angle β, and control the pitching assembly 1220 for driving the antenna dish 1211 to adjust the pitching angle θ, thereby further achieving the effect of driving the antenna dish 1211 to rotate to automatically search for the optimal signal angle.

It should be particularly noted that in other embodiments, the antenna bracket can include a pivot part pivotally connected to the yawing bracket, and the arc gear can be directly connected to the antenna bracket, thereby also allowing the pitching motor and pitching gear to drive the arc gear, directly driving the antenna assembly to pivot. The present disclosure is not limited to the above description.

Figure 5:
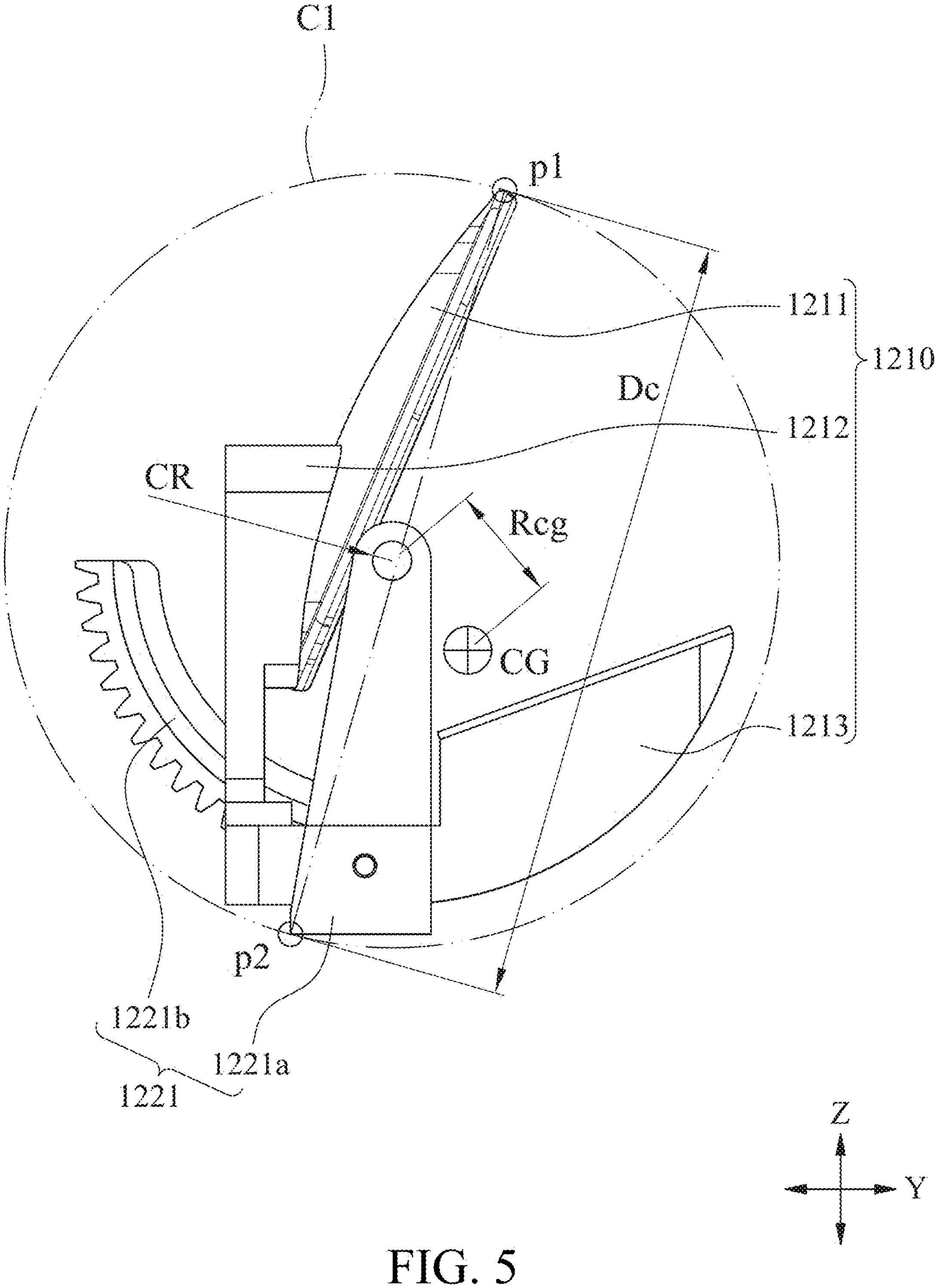
FIG. 5 is a side view of an antenna assembly and a pitching bracket of the double-axis rotating antenna structure of the embodiment in FIG. 1.

Please referring to FIG. 5 together with FIG. 1 to FIG. 4, FIG. 5 is a side view of the antenna assembly 1210 and pitching bracket 1221 of the double-axis rotating antenna structure 1000 of the embodiment in FIG. 1. The antenna assembly 1210 and pitching bracket 1221 project onto a virtual orthogonal plane perpendicular to the pitching axis X1 to form an outer contour, a maximum distance Dc is between two opposite points p1, p2 on the outer contour, a center of gravity of the antenna assembly 1210 and pitching bracket 1221 projects onto the virtual orthogonal plane to form a center of gravity point CG, a center of gravity distance Rcg on the virtual orthogonal plane is between the center of gravity point CG and the pitching axis X1, and the maximum distance Dc and the center of gravity distance Rcg satisfies the relationship Rcg/Dc≤0.375.

Specifically, the virtual orthogonal plane is the Y axis-Z axis plane, and the outer contour refers to the projected outer contour of the antenna dish 1211, the antenna bracket 1212, the heat sink 1213, and the pitching bracket 1221. The outer contour will have a plurality of opposite points, and two points p1, p2 can be found; the distance between these two points p1, p2 on the virtual orthogonal plane is longer than the distance between other opposite points on the virtual orthogonal plane, thereby defining the maximum distance Dc. Using the maximum distance Dc between these two points p1, p2 as the diameter, and using the midpoint of the line connecting these two points p1, p2 as the center, a virtual circle C1 can be drawn; such virtual circle C1 can encompass the outer contour, and these two points p1, p2 are on the virtual circle C1.

The center of gravity refers to the center of gravity of the antenna dish 1211, the antenna bracket 1212, the heat sink 1213, and the pitching bracket 1221; the projection of such center of gravity onto the virtual orthogonal plane will also form a point, which is the center of gravity point CG. When configuring the size of the pitching bracket 1221, the maximum distance Dc and the center of gravity distance Rcg can be taken into account to satisfy the relationship Rcg/Dc≤0.375.

In the present disclosure, since the micro transmission structure inside the pitching motor 1224 is less resistant to impact, the impact force transmitted to the pitching motor 1224 should be reduced to avoid damaging the pitching motor 1224. Accordingly, the center of gravity of the swinging objects (the antenna assembly 1210 and the pitching bracket 1221) that will pitch should be as close as possible to the pivot points CR. In this case, the torque experienced by the pitching motor 1224 is only the self-rotation torque of the swinging objects, and the self-rotation torque is equal to the rotational inertia of the swinging objects multiplied by the angular acceleration caused by the impact force. Since the impact force is directly applied to the pivot points CR, and the pivot points CR are fixed points, the torque effect generated by the impact force is counteracted and does not affect the pitching motor 1224.

Additionally, if the center of gravity of the swinging objects is as close as possible to the pivot points CR, the gravity can be absorbed by the pivot points CR, and will not generate a torque effect on the pitching motor 1224. Conversely, if the distance between the center of gravity and the pivot points CR increases, when the swinging objects rotate and tilt, gravity torque will be generated and applied to the pitching motor 1224, and the greater the tilt, the greater the torque experienced by the pitching motor 1224. If a high-specification pitching motor 1224 is used to withstand greater torque, the cost will be increased. Therefore, the present disclosure configures the center of gravity as close as possible to the pivot points CR, allowing the use of a lower-specification pitching motor 1224.

Furthermore, if the center of gravity is as close as possible to the pivot points CR, it indicates that the centroid is close to the pivot points CR, such that the rotation radius of the occupied space can be minimized. Conversely, if the pivot points CR are far away from the center of gravity, the rotation radius will increase, leading to a larger product size.

Therefore, by allowing the center of gravity and the outer contour of the antenna dish 1211, the antenna bracket 1212, the heat sink 1213, and the pitching bracket 1221 to be projected onto the virtual orthogonal plane, and allowing the maximum distance Dc and the center of gravity distance Rcg to satisfy the relationship Rcg/Dc≤0.375, it indicates that the center of gravity is as close as possible to the pivot points CR, achieving the beneficial effects of reducing impact force, using a lower-specification pitching motor 1224, and minimizing product size.

From the above embodiments, it can be seen that the present disclosure has the following advantages. First, by controlling via a circuit board, the yawing mechanism drives the antenna dish to adjust the yawing angle and the pitching assembly drives the antenna dish to adjust the pitching angle, and the product can have the capability of self-searching for the optimal signal orientation. This not only saves labor costs, but also allows the product to self-adapt to a signal field changing over time, rather than being fixed at an unchanging reception angle. Second, the main body and the central gear of the base are integrally formed using plastic molding, providing cost advantages compared to separate parts. Third, the support frame and the arc gear of the pitching bracket are integrally formed using plastic molding, providing cost advantages compared to separate parts. Fourth, the wheels provide rotational support, and the wheels can rotate around a center and functions similarly to bearings, such that the wheels can replace bearings to reduce costs. Fifth, the relationship between the maximum distance and the center of gravity distance can achieve the beneficial effects of reducing impact force, using a lower-specification pitching motor, and minimizing product size.

The foregoing description of the exemplary embodiments of the present disclosure has been presented only for the purposes of illustration and description and is not intended to be exhaustive or to limit the present disclosure. Many modifications and variations are possible in light of the above teaching.

The embodiments were chosen and described in order to explain the principles of the present disclosure and their practical applications. Alternative embodiments will become apparent to those skilled in the art to which the present disclosure pertains without departing from its spirit and scope.

What is claimed is:

1. A double-axis rotating antenna structure, comprising:
- a base;
- a yawing mechanism, comprising a yawing bracket, the yawing bracket being movably disposed on the base and yawing relative to the base; and
- an antenna module, comprising:
  - a pitching assembly, comprising a pitching bracket, the pitching bracket being movably disposed on the yawing bracket and pitching relative to the yawing bracket; and
  - an antenna assembly, disposed on the pitching bracket, and comprising an antenna dish;
- wherein the yawing bracket and the pitching bracket drive the antenna dish to yaw and pitch, thereby adjusting a yawing angle and a pitching angle of the antenna dish.

2. The double-axis rotating antenna structure according to claim 1, wherein the yawing bracket comprises a baseplate and two arms, the two arms being spaced apart and protruding from the baseplate, and the pitching bracket is pivotally connected between the two arms.

3. The double-axis rotating antenna structure according to claim 2, wherein the pitching bracket comprises a support frame and an arc gear, the support frame being pivotally connected to the two arms and locked to the antenna assembly, the arc gear protruding from a middle section of the support frame, and the pitching assembly further comprises a pitching motor and a pitching gear, the pitching motor being disposed on the baseplate, the pitching gear meshing with the arc gear and being driven by the pitching motor.

4. The double-axis rotating antenna structure according to claim 3, wherein the support frame and the arc gear are integrally formed.

5. The double-axis rotating antenna structure according to claim 4, wherein the support frame and the arc gear are made of a plastic material.

6. The double-axis rotating antenna structure according to claim 3, wherein the pitching angle ranges from 0 degrees to 90 degrees.

7. The double-axis rotating antenna structure according to claim 3, wherein the yawing bracket further comprises a groove located on the baseplate, and a position of the pitching gear corresponds to the groove.

8. The double-axis rotating antenna structure according to claim 2, wherein the base comprises a central gear, and the yawing mechanism further comprises a yawing drive gear and a yawing transmission gear, the yawing drive gear being disposed between the baseplate and the base, the yawing transmission gear meshing between the yawing drive gear and the central gear, the yawing drive gear being driven to move along a circumferential direction of the central gear.

9. The double-axis rotating antenna structure according to claim 8, wherein
- the yawing mechanism further comprises a yawing motor, the yawing motor being disposed on the baseplate and driving the yawing drive gear.

10. The double-axis rotating antenna structure according to claim 2, wherein the yawing mechanism further comprises a plurality of wheels, the wheels being spaced apart and pivotally disposed on a lower surface of the baseplate and contacting the base.

11. The double-axis rotating antenna structure according to claim 2, wherein the pitching bracket is pivotally connected to the two arms at two pivot points, the two pivot points connectedly form a pitching axis, the antenna assembly and the pitching bracket project onto a virtual orthogonal plane perpendicular to the pitching axis to form an outer contour, a maximum distance Dc is between two opposite points on the outer contour, a center of gravity of the antenna assembly and the pitching bracket projects onto the virtual orthogonal plane to form a center of gravity point, a center of gravity distance Rcg on the virtual orthogonal plane is between the center of gravity point and the pitching axis, and the maximum distance Dc and the center of gravity distance Rcg satisfies a relationship $Rcg/Dc \leq 0.375$.

12. A double-axis rotating antenna structure, comprising:
- a yawing mechanism, comprising a yawing bracket; and
- an antenna module, comprising:
  - a pitching motor, disposed on the yawing bracket;
  - a pitching gear, connected to the pitching motor and driven by the pitching motor to rotate;
  - an arc gear, driven by the pitching gear; and
  - an antenna assembly, linked by the arc gear and comprising an antenna dish;
- wherein the pitching motor drives the pitching gear, which in turn drives the arc gear to adjust a pitching angle of the antenna dish;
- wherein the yawing bracket yaws to adjust a yawing angle of the antenna dish.

13. The double-axis rotating antenna structure according to claim 12, wherein the antenna assembly further comprises a support frame connected to the arc gear, the antenna assembly is connected to the support frame, the yawing bracket comprises a baseplate and two arms, the two arms being spaced apart and protruding from the baseplate, and the support frame is pivotally connected between the two arms.

14. The double-axis rotating antenna structure according to claim 13, wherein the arc gear protrudes from a middle section of the support frame.

15. The double-axis rotating antenna structure according to claim 14, wherein the support frame and the arc gear are integrally formed.

16. The double-axis rotating antenna structure according to claim 15, wherein the support frame and the arc gear are made of a plastic material.

17. The double-axis rotating antenna structure according to claim 13, wherein the yawing mechanism further comprises a plurality of wheels, the wheels being spaced apart and pivotally disposed on a lower surface of the baseplate.

18. The double-axis rotating antenna structure according to claim 13, wherein the support frame and the arc gear together form a pitching bracket, the support frame is pivotally connected to the two arms at two pivot points, the two pivot points connectedly form a pitching axis, the antenna assembly and the pitching bracket project onto a virtual orthogonal plane perpendicular to the pitching axis to form an outer contour, a maximum distance Dc is between two opposite points on the outer contour, a center of gravity of the antenna assembly and the pitching bracket projects onto the virtual orthogonal plane to form a center of gravity point, a center of gravity distance Rcg on the virtual orthogonal plane is between the center of gravity point and the pitching axis, and the maximum distance Dc and the center of gravity distance Rcg satisfies a relationship $Rcg/Dc \leq 0.375$.

* * * * *